US008137877B2

(12) United States Patent
Kim et al.

(10) Patent No.: US 8,137,877 B2
(45) Date of Patent: Mar. 20, 2012

(54) ELECTROPHOTOGRAPHIC PHOTORECEPTOR HAVING EXCELLENT STABILITY IN TERMS OF ELECTRICAL PROPERTIES AND INTERLAYER ADHESION STRENGTH AND ELECTROPHOTOGRAPHIC IMAGING APPARATUS EMPLOYING THE SAME

(75) Inventors: Young-don Kim, Suwon-si (KR); Moto Makino, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 797 days.

(21) Appl. No.: 12/239,006

(22) Filed: Sep. 26, 2008

(65) Prior Publication Data

US 2009/0197191 A1 Aug. 6, 2009

(30) Foreign Application Priority Data

Feb. 1, 2008 (KR) ........................ 10-2008-0010791

(51) Int. Cl.
*G03G 5/14* (2006.01)
*G03G 15/04* (2006.01)
*C08K 3/10* (2006.01)

(52) U.S. Cl. .............. 430/64; 430/60; 430/62; 524/413; 399/115

(58) Field of Classification Search .................... 430/60, 430/62, 64; 524/413; 399/115, 116, 119
See application file for complete search history.

(56) References Cited

U.S. PATENT DOCUMENTS 6,967,069 B2 * 11/2005 Wu et al. ...................... 430/59.4
2006/0204872 A1 * 9/2006 Tong et al. ...................... 430/60
2008/0199793 A1 * 8/2008 Lim ............................ 430/57.2

FOREIGN PATENT DOCUMENTS

JP 2001-265037 9/2001
JP 2005-227789 8/2005

* cited by examiner

*Primary Examiner* — Christopher Rodee
*Assistant Examiner* — Jonathan Jelsma
(74) *Attorney, Agent, or Firm* — Stanzione & Kim, LLP

(57) ABSTRACT

An electrophotographic photoreceptor including an undercoat layer and a photosensitive layer that are sequentially formed on an electrically conductive substrate, wherein the undercoat layer has a structure in which metal oxide particles and dialkylcitrate-chelated zirconate represented by Formula 1, illustrated below, are dissolved or dispersed in a binder resin, and an electrophotographic imaging apparatus including the electrophotographic photoreceptor:

<Formula 1>

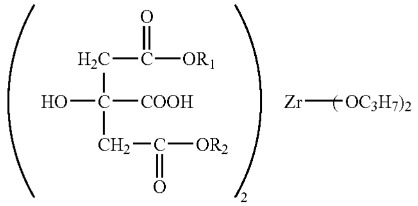

wherein $R_1$ and $R_2$ are each independently a $C_{1-20}$ linear or branched alkyl group. The electrophotographic photoreceptor has excellent stability of electrical properties and interlayer adhesion strength, by including the undercoat layer.

15 Claims, 1 Drawing Sheet

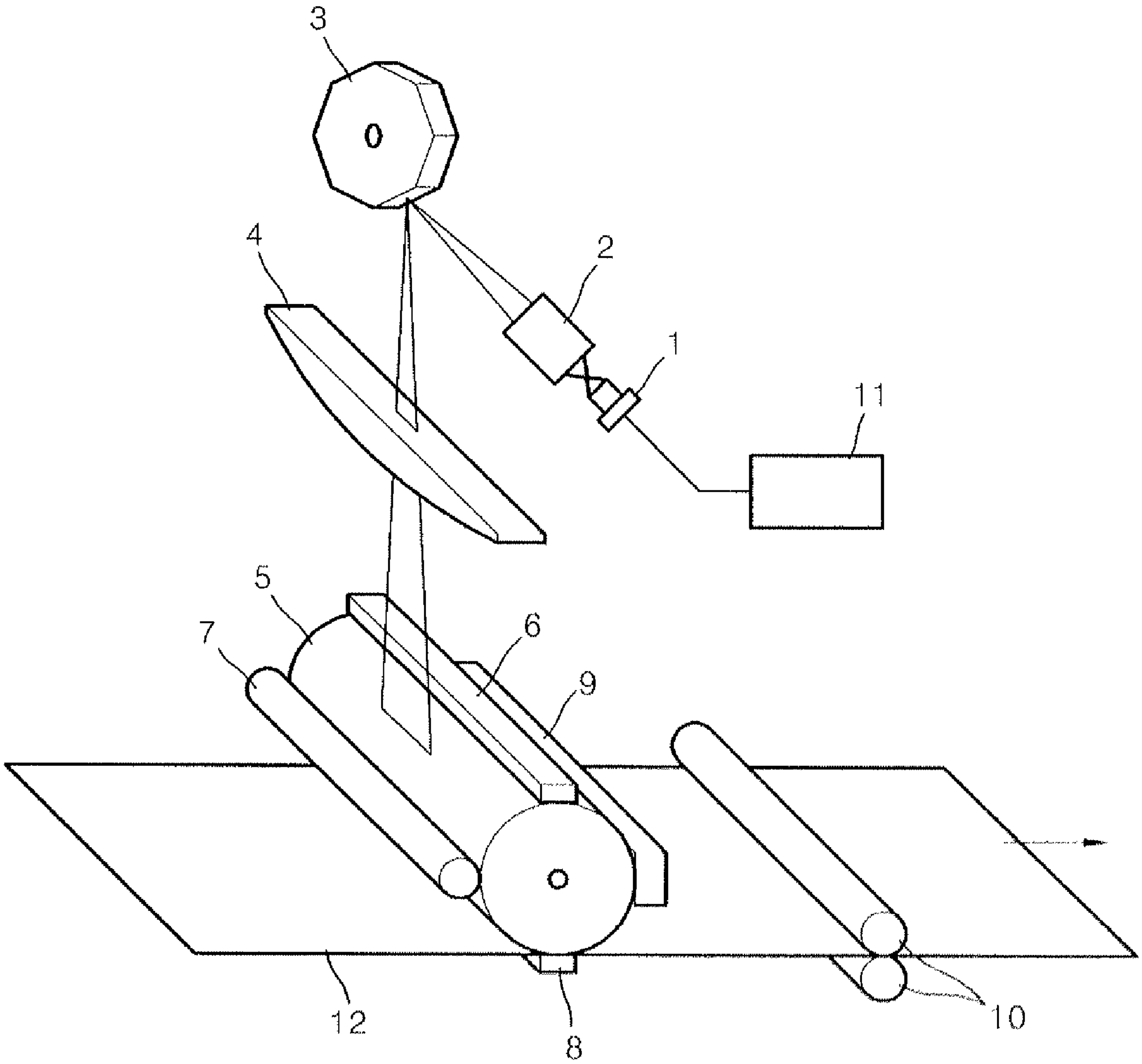
3
4
2
1
11
5
7
6
9
12
8
10

ELECTROPHOTOGRAPHIC PHOTORECEPTOR HAVING EXCELLENT STABILITY IN TERMS OF ELECTRICAL PROPERTIES AND INTERLAYER ADHESION STRENGTH AND ELECTROPHOTOGRAPHIC IMAGING APPARATUS EMPLOYING THE SAME

CROSS-REFERENCE TO RELATED APPLICATIONS

This application claims priority under 35 U.S.C. §119(a) from Korean Patent Application No. 10-2008-0010791, filed on Feb. 1, 2008, in the Korean Intellectual Property Office, the disclosure of which is incorporated herein in its entirety by reference.

BACKGROUND OF THE INVENTION

1. Field of the Invention

The present general inventive concept relates to an electrophotographic photoreceptor and an electrophotographic imaging apparatus employing the same, and more particularly, to an electrophotographic photoreceptor having excellent stability in terms of electrical properties and interlayer adhesion strength and an electrophotographic imaging apparatus employing the same.

2. Description of the Related Art

Electrophotographic devices such as laser printers, photocopiers, facsimile machines, CRT printers, liquid crystal printers, LED printers, plotters, and the like include an electrophotographic photoreceptor including a photosensitive layer formed on an electrically conductive substrate. The electrophotographic photoreceptor can be in a form of a plate, a disk, a sheet, a belt, a drum, or the like and forms an image as follows. First, a surface of the photosensitive layer is uniformly and electrostatically charged, and then the charged surface is exposed to a pattern of light, thus forming the image. The light exposure selectively dissipates the charge in the exposed regions where the light strikes the surface, thereby forming a pattern of charged and uncharged regions, which is referred to as a latent image. Then, a wet or dry toner is provided in a vicinity of the latent image, and toner droplets or particles collect in either the charged or uncharged regions to form a toner image on the surface of the photosensitive layer. The resulting toner image may be transferred to a suitable final or intermediate receiving surface, such as paper, or the photosensitive layer may function as a final receptor for receiving the image.

Electrophotographic photoreceptors can be categorized into a negative charge type electrophotographic photoreceptor and a positive charge type electrophotographic photoreceptor according to a charging method. Currently, the negative charge type electrophotographic photoreceptor in which a surface of the electrophotographic photoreceptor is negatively charged and exposed to light is widely used. However, due to disadvantages such as ozone generation caused by negatively charging the electrophotographic photoreceptor, limitations in terms of resolution improvement, and the like, research into a positive charge type electrophotographic photoreceptor in which a surface of the electrophotographic photoreceptor is positively charged and exposed to light has recently been actively conducted.

In addition, electrophotographic photoreceptors can be generally categorized into two types. The first is a laminated-type electrophotographic photoreceptor having a two-layered photosensitive layer including a charge generating layer including a binder resin and a charge generating material (CGM), and a charge transporting layer including a binder resin and a charge transporting material (usually, a hole transporting material (HTM)). The laminated-type electrophotographic photoreceptor may have two configurations, that is, a structure in which the charge generating layer and the charge transporting layer are sequentially formed on an electrically conductive substrate, and a structure in which the charge transporting layer and the charge generating layer are sequentially formed on an electrically conductive substrate. In general, the laminated-type electrophotographic photoreceptor is used in the fabrication of a negative (−) charge type electrophotographic photoreceptor. The other type is a single layered-type electrophotographic photoreceptor in which a binder resin, a CGM, an HTM, and an electron transporting material (ETM) are included in a single layered photosensitive layer. In general, the single layered-type electrophotographic photoreceptor is used in fabrication of a positive (+) charge type electrophotographic photoreceptor.

In general, an undercoat layer is formed between the electrically conductive substrate and the photosensitive layer. The undercoat layer improves imaging properties by preventing charges from being injected into the photosensitive layer from the electrically conductive substrate, covers surface defects of the electrically conductive substrate, improves adhesion between the electrically conductive substrate and the photosensitive layer, and prevents dielectric breakdown of the photosensitive layer. Conventionally, alumite, i.e., aluminum oxides, is widely used in the formation of the undercoat layer. However, in order to reduce costs, an undercoat layer formed by coating a coating dispersion to form an undercoat layer in which inorganic particles are dispersed in a binder resin solution on an electrically conductive substrate has recently been widely used.

A binder resin of the undercoat layer may be divided into a thermosetting resin and a thermoplastic resin. When a thermoplastic resin is used, a process of drying and cooling the undercoat layer after a coating process is not required. In addition, a shelf life of a coating dispersion to form an undercoat layer becomes longer. Accordingly, using a thermoplastic resin as a binder resin for the undercoat layer is economical. An alcohol-soluble nylon resin is widely used as a thermoplastic resin, taking into account suitable properties thereof of adhesion to an electrically conductive substrate, a coating property and an electrical barrier property. However, the alcohol-soluble nylon resin generally has high absorptivity, and electrical properties and imaging properties of the electrophotographic photoreceptor are highly environmentally dependent. To improve a resistance of the undercoat layer in low temperature and low humidity conditions, inorganic particles such as metal oxide particles, or the like, in particular, titanium dioxide particles are used. Such titanium dioxide having an average primary particle diameter of about 30 to 50 nm is widely used, taking into consideration dispersion stability of a coating dispersion and resistivity of a produced undercoat layer.

However, when the undercoat layer is formed only of a binder resin and inorganic particles, adhesion between the electrically conductive substrate and the photosensitive layer, between the electrically conductive substrate and the charge generating layer, and between the charge generating layer and the charge transporting layer deteriorates. Thus, the photosensitive layer, the charge generating layer and the charge transporting layer can be easily damaged by even small impacts, or in severe cases, the electrically conductive substrate and the photosensitive layer, the electrically conductive substrate and the charge generating layer, and the charge generating layer and the charge transporting layer may be detached from each other.

To address these adhesion reduction problems, Japanese Patent Laid-Open Publication No. 2005-227789 discloses a method of improving adhesion by adding a titanium-containing alcohol-soluble chelate compound to a coating dispersion to form an undercoat layer to be cross-linked with a binder resin of a charge generating layer and a charge transporting layer.

However, when the titanium-containing alcohol-soluble chelate compound is added to the coating dispersion to form an undercoat layer, precipitation is easily generated or the dispersibility of the dispersion deteriorates, thus reducing the storage stability of the coating dispersion, and discoloration occurs easily with storage time. When a photoreceptor is prepared using such a discolored coating dispersion, electrical properties of the photoreceptor also deteriorate easily.

SUMMARY OF THE INVENTION

The present general inventive concept provides an electrophotographic photoreceptor having excellent stability in terms of electrical properties and interlayer adhesion strength.

The present general inventive concept also provides an electrophotographic imaging apparatus including the electrophotographic photoreceptor having the properties described above.

The present general inventive concept also provides a composition to form an undercoat layer, having high dispersion stability, resistance to precipitation and resistance to discoloration, the composition being used to easily prepare the electrophotographic photoreceptor having the properties described above.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing an electrophotographic photoreceptor including an undercoat layer and a photosensitive layer that are sequentially formed on an electrically conductive substrate, wherein the undercoat layer has a structure in which metal oxide particles and dialkylcitrate-chelated zirconate represented by Formula 1 below are dissolved or dispersed in a binder resin:

<Formula 1>

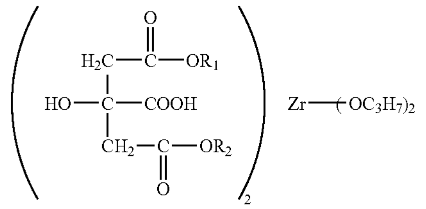

wherein $R_1$ and $R_2$ are each independently a $C_{1-20}$ linear or branched alkyl group.

The foregoing and/or other aspects and utilities of the general inventive concept may also be achieved by providing an electrophotographic imaging apparatus including an electrophotographic photoreceptor, a charging unit to charge a photosensitive layer of the electrophotographic photoreceptor, a light exposure unit to form an electrostatic latent image on a surface of the photosensitive layer of the electrophotographic photoreceptor, and a developer to develop the electrostatic latent image, wherein the electrophotographic photoreceptor includes an undercoat layer and a photosensitive layer that are sequentially formed on an electrically conductive substrate, and the undercoat layer has a structure in which metal oxide particles and dialkylcitrate-chelated zirconate represented by Formula 1 above are dissolved or dispersed in a binder resin.

The foregoing and/or other aspects and utilities of the general inventive concept may also be achieved by providing a composition including a binder resin, metal oxide particles, dialkylcitrate-chelated zirconate represented by Formula 1, and a solvent or a dispersing medium.

The foregoing and/or other aspects and utilities of the general inventive concept may also be achieved by providing an electrophotographic photoreceptor including an electrically conductive substrate, an undercoat layer and a photosensitive layer that are sequentially formed on the electrically conductive substrate, the undercoat layer has a structure associated in which metal oxide particles and dialkylcitrate-chelated zirconate having at least one of a $C_{1-20}$ linear and branched alkyl group are dissolved or dispersed in a binder resin.

The foregoing and/or other aspects and utilities of the general inventive concept may also be achieved by providing an electrophotographic imaging apparatus including an electrophotographic photoreceptor, a charging unit to charge a photosensitive layer of the electrophotographic photoreceptor, a light exposure unit to form an electrostatic latent image on a surface of the photosensitive layer of the electrophotographic photoreceptor, and a developer to develop the electrostatic latent image, wherein the electrophotographic photoreceptor includes an undercoat layer having a structure associated in which metal oxide particles and dialkylcitrate-chelated zirconate including at least one of a $C_{1-20}$ linear and branched alkyl group are dissolved or dispersed in a binder resin.

BRIEF DESCRIPTION OF THE DRAWINGS

The above and other features and utilities of the present general inventive concept will become more apparent by describing in detail exemplary embodiments thereof with reference to the accompanying drawing:

FIG. 1 is a view illustrating an electrophotographic imaging apparatus according to an embodiment of the present general inventive concept.

DETAILED DESCRIPTION OF THE PREFERRED EMBODIMENTS

Hereinafter, the present general inventive concept will be described more fully with reference to the accompanying drawing, in which exemplary embodiments of the general inventive concept are illustrated.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

An embodiment of present general inventive concept provides an electrophotographic photoreceptor including an undercoat layer and a photosensitive layer that are sequentially formed on an electrically conductive substrate.

The electrically conductive substrate may be in a form of a drum, pipe, belt, plate or the like which may include any conductive material, for example, a metal, or an electrically conductive polymer, or the like. The metal may be aluminum, an aluminum alloy, vanadium, nickel, copper, zinc, palladium, indium, tin, platinum, stainless steel, chrome, or the like. The electrically conductive polymer may be a polyester resin, polycarbonate resin, a polyamide resin, a polyimide resin, mixtures thereof, or a copolymer of monomers used in preparing the resins described above in which an electrically conductive material such as a conductive carbon, tin oxide, indium oxide, or the like is dispersed. An insulating substrate, such as an organic polymer sheet, paper, glass or the like on which a metal is deposited or a metal sheet is laminated may be used as the electrically conductive substrate.

The undercoat layer is formed between the electrically conductive substrate and the photosensitive layer. The undercoat layer has a structure in which metal oxide particles and dialkylcitrate-chelated zirconate represented by Formula 1 below are dissolved or dispersed in a binder resin:

<Formula 1>

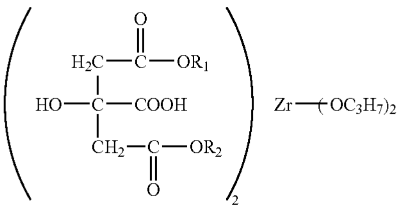

wherein $R_1$ and $R_2$ are each independently a $C_{1-20}$ linear or branched alkyl group.

The metal oxide particles may include at least one selected from the group consisting of tin oxide, indium oxide, zinc oxide, titanium oxide, silicon oxide, zirconium oxide, aluminum oxide, and the like. The average primary particle diameter of the metal oxide particles may be in a range of about 10 to 200 nm, preferably in a range of about 15 to 100 nm, and more preferably in a range of about 30 to 100 nm, in terms of dispersibility. When the average primary particle diameter of the metal oxide particles is less than about 10 nm, the undercoat layer may not effectively prevent a Moiré phenomenon from occurring. Alternatively, when the average primary particle diameter of the metal oxide particle is greater than 200 nm, the metal oxide particles of a composition to form the undercoat layer may be easily precipitated. This causes bad dispersion uniformity of the metal oxide particles in the undercoat layer. A shape of the metal oxide particles of the present general inventive concept includes a dendrite shape, a needle shape, a granular shape, or the like. When the metal oxide particle having such a shape is titanium oxide, the metal oxide particle may be a crystalline type such as an anatase type and a rutile type, or an amorphous type. Any crystalline type of titanium oxide may be used, or the two of the crystalline types of titanium oxide may be used in combination. Titanium oxide having a rutile crystalline type and a granular shape may preferably used as the crystalline type titanium oxide.

The binder resin of the undercoat layer may be at least one selected from the group consisting of a thermosetting resin obtained by thermally polymerizing an oil-free alkyd resin, an amino resin such as a butylated melamine resin, a photosetting resin obtained by polymerizing a resin having an unsaturated bond, such as unsaturated polyurethane or unsaturated polyester, a polyamide resin, a polyurethane resin, an epoxy resin, or the like.

In the dialkylcitrate-chelated zirconate of Formula 1, $R_1$ and $R_2$ are each independently a $C_{1-20}$ linear or branched alkyl group. Preferably, $R_1$ and $R_2$, for example, are each independently a $C_{1-10}$ linear or branched alkyl group including $R_1$ and $R_2$ are each independently a $C_{1-5}$ linear or branched alkyl group. Examples of the alkyl group include methyl, ethyl, iso-propyl, n-propyl, neo-propyl, and the like. Herein, the alkyl group may be used alone or in combination of the two alkyl groups. The dialkylcitrate-chelated zirconate may be commercially available under the product name Tyzor® ZEC manufactured by Dupont. The dialkylcitrate-chelated zirconate can improve dispersibility, resistance to precipitation, storage stability and resistance to discoloration of a coating dispersion to form the undercoat layer. Thus, the electrophotographic photoreceptor of the present embodiment has excellent electrical properties and improved interlayer adhesion strength due to an inclusion of the undercoat layer formed of the composition having the properties described above. It is thought that this is because the dialkylcitrate-chelated zirconate of Formula 1 can interact with a functional group such as a hydroxyl group or carboxyl group included in the binder resin and metal oxide particles, and thus agglomeration or gelation of the metal oxide particles can be effectively prevented, and the dialkylcitrate-chelated zirconate of Formula 1 can be crosslinked with the binder resin, thus interlayer adhesion strength between the undercoat layer and the photosensitive layer being increased.

The undercoat layer may include 50 to 200 parts by weight, such as 80 to 160 parts by weight, including 120 to 150 parts by weight of the metal oxide particles and 0.2 to 2 parts by weight, such as 0.5 to 1 parts by weight, including 0.8 to 1 parts by weight of the dialkylcitrate-chelated zirconate of Formula 1 based on 100 parts by weight of the binder resin.

When an amount of metal oxide particles is less than 50 parts by weight based on 100 parts by weight of the binder resin, resistivity of the undercoat layer is too low and blocking abilities by the metal oxide particles decrease, and thus an optical density of the obtained images may be too low. When an amount of metal oxide particles exceeds 200 parts by weight based on 100 parts by weight of the binder resin, an effect of improvement on interlayer adhesion strength by the undercoat layer decreases and resistivity of the undercoat layer is too high, and thus the optical density of the obtained images may be too high.

When an amount of dialkylcitrate-chelated zirconate of Formula 1 is less than 0.2 parts by weight based on 100 parts by weight of the binder resin, the dispersion stability and resistance to discoloration of the metal oxide particles, and the electrical properties and imaging properties of the electrophotographic photoreceptor cannot be satisfactorily improved. When the amount of dialkylcitrate-chelated zirconate of Formula 1 is greater than 2 parts by weight based on 100 parts by weight of the binder resin, dialkylcitrate-chelated zirconate compatibility with the binder resin decreases and dialkylcitrate-chelated zirconate adversely affects the dispersion stability.

Hereinafter, a method of forming the undercoat layer will be described.

An appropriate binder resin is dissolved in a solvent to prepare a binder resin solution. Separately, metal oxide particles are dispersed in a dispersion medium by milling, grinding, or the like to prepare a metal oxide particle dispersion. Then, the binder resin solution and the metal oxide particle dispersion are mixed together.

A disperser used to prepare a uniform dispersion of metal oxide particles may be any device that is commonly used in fields of paints and inks. Examples of the disperser may include an attritor, a paint shaker, a ball mill, a sand mill, a high speed mixer, a banbury mixer, a roll mill, a three-roll mill, a nanomizer, a microfludizer, a stamp mill, a planetary mill, a vibration mill, a kneader, and the like.

A solvent or dispersion medium may vary according to a type of binder resin, and be selected in such a way that does not affect a layer adjacent to the undercoat layer during a coating process. Examples of the solvent or dispersion medium include an aromatic hydrocarbon such as benzene, xylene, ligroin, monochlorobenzene, dichlorobenzene, and the like; ketones such as acetone, methylethylketone, cyclohexanone, and the like; alcohols such as methanol, ethanol, isopropanol, and the like; esters such as ethyl acetate, methyl cellosolve, and the like; an aliphatic halogenated hydrocarbon such as carbon tetrachloride, chloroform, dichloromethane, dichloroethane, trichloroethylene, and the like; ethers such as tetrahydrofurane, dioxane, dioxolane, ethylene glycol monomethyl ether, and the like; amides such as N,N-dimethyl formamide, N,N-dimethyl acetamide, and the like; sulfoxides such as dimethyl sulfoxide, and the like; and the like. The solvent or dispersion medium may be used alone or in a combination of two of the materials described above.

Next, the dialkylcitrate-chelated zirconate of Formula 1 is added to the mixture of the binder resin solution and the metal oxide particle dispersion, and the resultant is dispersed further using ultrasonic waves in order to prepare a coating dispersion to form an undercoat layer.

Herein, the coating dispersion include 50 to 200 parts by weight of the metal oxide particles and 0.2 to 2 parts by weight of the dialkylcitrate-chelated zirconate of Formula 1 based on 100 parts by weight of the binder resin, and appropriate amount of the solvent or dispersion medium which is adjusted so that a total solids content of the binder resin, the metal oxide particles and dialkylcitrate-chelated zirconate of Formula 1 is in a range of 10 to 30 wt %. An amount of solvent or dispersion medium may be adjusted so that total solids content thereof is in a range of about 10 to 20 wt %. The coating dispersion to form an undercoat layer is coated on an electrically conductive substrate and dried to complete a preparation of the undercoat layer. The coating may be performed using a general coating device such as a dip coater, a ring coater, a spray coater, a wire bar coater, an applicator, a doctor blade, a roller coater, a curtain coater, a bead coater, or the like.

A thickness of the undercoat layer may be in a range of 0.1 to 20 μm such as in a range of 0.3 to 10 μm. When the thickness of the undercoat layer is less than 0.1 μm, the undercoat layer may be damaged by a high voltage such that perforation may occur in the undercoat layer, resulting in a non-uniformly coated undercoat layer or black spots in images obtained. When the thickness of the undercoat layer is greater than 20 μm, adjusting the electrical properties of the electrophotographic photoreceptor is difficult and the image quality may be decreased.

The photosensitive layer is formed on the undercoat layer. The photosensitive layer may be categorized into two types; a laminated type and a single-layered type. The laminated type includes a charge generating layer including a charge generating material and a charge transporting layer including a charge transporting material. The single-layered type includes a charge generating material and a charge transporting material in a single layer.

An electrophotographic photoreceptor including the laminated-type photosensitive layer will be described. The charge generating layer formed on the undercoat layer includes a binder resin and a charge generating material that is dispersed or dissolved in the binder resin. Examples of the charge generating material includes an organic pigment or a dye selected from the group consisting of a phthalocyanine-based compound, a perylene-based compound, a perinone-based compound, an indigo-based compound, a quinacridone-based compound, an azo-based compound, a bisazo-based compound, a trisazo-based compound, a bisbenzoimidazole-based compound, polycycloquinone-based compound, a pyrolopyrrole-based compound, a metal-free naphthalocyanine-based compound, a metal naphthalocyanine-based compound, a squaline-based compound, a squarylium-based compound, an azulenium-based compound, a quinone-based compound, a cyanine-based compound, a pyrylium-based compound, an anthraquinone-based compound, a triphenylmethane-based compound, a threne-based compound, a toluidine-based compound, a pyazolin-based compound, a quinachridone-based compound, and the like, but the present general inventive concept is not limited thereto. The charge generating materials may be used alone or in combination of two or more. The charge generating material may be a metal-free phthalocyanine-based pigment represented by Formula 2 below, a metal phthalocyanine-based pigment represented by Formula 3 below, or a mixture, particularly, a mixed crystal thereof:

<Formula 2>

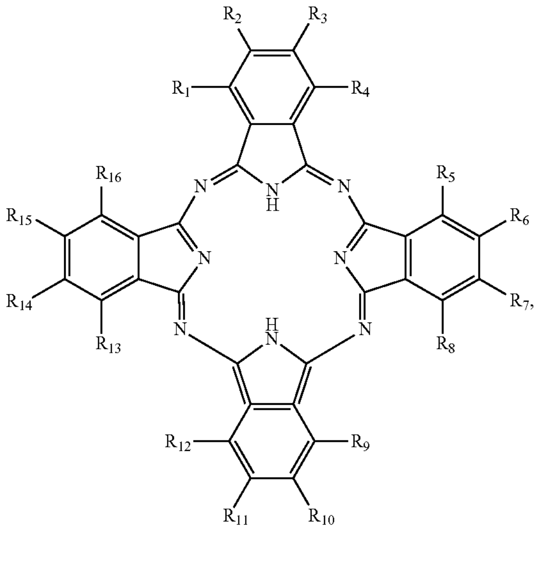

-continued

<Formula 3>

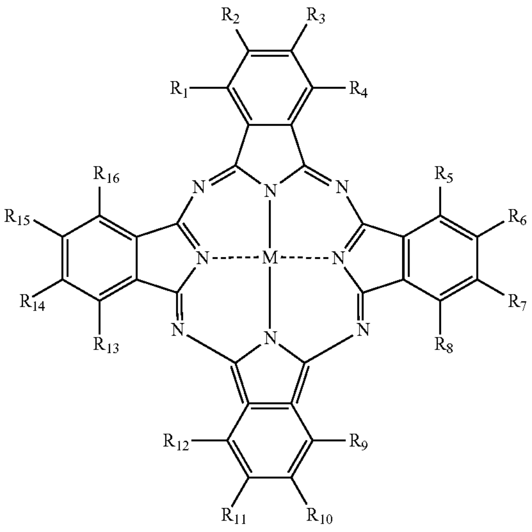

wherein $R_1$-$R_{16}$ are each independently a hydrogen atom, a halogen atom, a nitro group, an alkyl group, or an alkoxy group, and M is one selected from the group consisting of copper, chloroaluminum, chloroindium, chlorogalium, chlorogermanium, oxobanadyl, oxotitanyl, hydroxygermanium, and hydroxygalium. The alkyl group and the alkoxy group may have 1-30 carbons, such as 1-15 carbons, including 1-7 carbons. The alkyl group and the alkoxy group may be substituted with any substituent, such as a halogen atom, a nitro group and the like.

A crystalline type of the metal-free and metal phthalocyanine-based pigments of Formulas 2 and 3 is not particularly limited. However, taking into account photosensitivity improvement and dispersion stability, the metal-free phthalocyanine-based pigment may have an X-type or T-type crystalline type, and the metal phthalocyanine-based pigment may be a Y-type oxotitanyl phthalocyanine, an a-type oxotitanyl phthalocyanine, or the like.

When the charge generating layer includes the phthalocyanine-based compound as a charge generating material, other charge generating materials listed above may be used together in order to adjust spectral sensitivity. In addition, the charge generating layer may further include an electron accepting material in order to improve sensitivity, decrease residual potential and/or reduce fatigue in the case of repetitive use. In particular, the electron accepting material may be a compound having a high electron affinity including succinic anhydride, maleic anhydride, dibromosuccinic anhydride, phthalic anhydride, 3-nitrophthalic anhydride, 4-nitrophthalic anhydride, pyromellitic anhydride, pyromellitic acid, trimellitic acid, trimellitic anhydride, phthalimide, 4-nitrophthalimide, tetracyanoethylene, tetracyanoquinodimethane, chloranyl, bromanyl, o-nitrobenzoic acid, p-nitrobenzoic acid, and the like. An amount of electron receiving material may be in a range of 0.01 to 100 wt % based on a weight of the charge generating material.

A thickness of the charge generating layer may be in a range of 0.01 to 10 μm, such as in a range of 0.05 to 3 μm. When the thickness of the charge generating layer is less than 0.01 μm, the charge generating layer may not be uniformly formed, and photosensitivity and mechanical durability are not sufficient. When the thickness of the charge generating layer is greater than 10 μm, electrophotographic properties tend to deteriorate.

In the charge generating layer according to an embodiment of the present general inventive concept, amounts of charge generating material and binder resin are not particularly limited, and may be selected within the amount range that is conventionally used in the art. For example, the amount of binder resin may be in a range of 50 to 150 parts by weight, such as in a range of 60 to 100 parts by weight based on 100 parts by weight of the charge generating material. When an amount of binder resin is less than 50 parts by weight based on 100 parts by weight of the charge generating material, the charge generating material is not sufficiently dispersed, and thus a stability of a coating dispersion decreases, forming a uniform charge generating layer when the coating dispersion is coated on the undercoat layer is difficult, and an adhesion strength between the charge generating layer and the undercoat layer and between the charge generating layer and the charge transporting layer may deteriorate. When the amount of binder resin is greater than 150 parts by weight based on 100 parts by weight of the charge generating material, it is difficult to maintain a charged potential, and due to an excessive amount of binder resin, sensitivity is not sufficient, resulting in poor image quality. When the charge generating material is capable of forming a film, the binder resin may not be used. The charge generating layer may be formed by coating, deposition, sputtering, or the like.

The charge transporting layer is formed on the charge generating layer. The charge transporting layer may include a binder resin and a charge transporting material that is dispersed or dissolved in the binder resin. The charge transporting material includes a hole transporting material to transport holes and an electron transporting material to transport electrons. When the laminated type photoreceptor is used as a negatively charged type, the charge transporting layer primarily includes the hole transporting material as the charge transporting material. When the laminated type photoreceptor is used as a positively charged type, the charge transporting layer primarily includes the electron transporting material. When the laminated type photoreceptor is used both as a negatively charged type positive and as a positively charged type, the hole transporting material and the electron transporting material are used together. When the charge transporting material has a film forming capability, the binder resin may not be necessarily used. However, the charge transporting material having a low molecular weight usually does not have the film forming capability, so that the charge transporting layer is formed using the binder resin.

A thickness of the charge transporting layer may be preferably in a range of 2 to 100 μm, such as in a range of 5 to 50 μm, including in a range of 10 to 40 μm. When the thickness of the charge transporting layer is less than 2 μm, charging properties tend to deteriorate. Alternatively, when the thickness of the charge transporting layer is greater than 100 μm, response speed and image quality tend to deteriorate. In the charge transporting layer of the present embodiment, amounts of charge transporting material and binder resin are not particularly limited, and may be selected within the amount range that is conventionally used in the art. For example, the amount of charge transporting material may be in a range of 10 to 200 parts by weight, such as in a range of 20 to 150 parts by weight based on 100 parts by weight of the binder resin. When the amount of charge transporting material is less than 10 parts by weight, photosensitivity is insufficient due to an insufficient charge transporting ability, and thus residual potential tends to become higher. Alternatively, when the amount of the charge transporting material is greater than 200 parts by weight, the mechanical strength tends to be reduced.

The charge transporting material that is dispersed or dissolved in the binder resin of the charge transporting layer may be a known hole transporting material and/or a known electron transporting material. The hole transporting material may be a low molecular compound, for example, pyrene-based, carbazole-based, hydrazone-based, oxazole-based, oxadiazole-based, pyrazoline-based, arylamine-based, arylmethane-based, benzidine-based, thiazole-based, styryl-based, stylbene-based, butadiene-based, butadiene-based amine compound, or the like. In addition, the hole transporting material may be a polymer compound, for example, polyarylalkane, polyvinylcarbazole, halogenated polyvinylcarbazole, polyvinylpyrene, polyvinylanthracene, polyvinylacridine, a formaldehyde-based condensed resin such as a pyrene-formaldehyde resin and an ethylcarbazole-formaldehyde resin, a triphenylmethane polymer, polysilane, an N-acrylamidemethylcarbazole polymer, a triphenylmethane polymer, a styrene copolymer, polyacenaphthene, polyindene, a copolymer of acenaphthylene and styrene, or the like. Examples of the electron transporting material include an electron attracting low-molecular weight compound such as a benzoquinone-based compound, a naphthoquinone-based compound, an anthraquinone-based compound, a malononitrile-based compound, a fluorenone-based compound, a dicyanofluorenone-based compound, a benzoquinoneimine-based compound, a diphenoquinone-based compound, a stilbene quinone-based compound, a diiminoquinone-based compound, a dioxotetracenedione-based compound, a thiopyrane-based compound, a tetracyanoethylene-based compound, a tetracyanoquinodimethane-based compound, a xanthone-based compound, a phenanthraquinone-based compound, a phthalic anhydride-based compound, a naphthalene-based compound, a naphthalene-tetracarboxylic acid diimide-based compound, or the like. However, the electron transporting material is not limited to the examples described above, and a polymer compound having an electron transporting ability, a pigment having an electron transporting ability, or the like may be used. In the electrophotographic photoreceptor of the present embodiment, the charge transporting material described above may be used alone or in the combination of at least two of these materials. For example, when a combination of the butadiene-based amine compound and the hydrazone-based compound or a combination of two suitable benzidine-based compounds is used as the charge transporting material, image degradation caused by repetitive use of the electrophotographic photoreceptor can be prevented. Thus, the charge transporting material may be the combination of the butadiene-based amine compound and the hydrazone-based compound or a combination of two suitable benzidine-based compounds. In addition, the charge transporting material may be any charge transporting material having a charge mobility greater than $10^{-8}$ $cm^2/s$, in addition to the hole transporting materials and the electron transporting materials described above.

The charge transporting layer may further include a thermal stabilizer, if necessary. The thermal stabilizer used in the charge transporting layer may be a phenol-based thermal stabilizer, a phosphite-based thermal stabilizer, a thioether-based thermal stabilizer, or the like. An amount of thermal stabilizer in the charge transporting layer may be in a range of 0.01 to 15 wt %, such as in a range of 0.01 to 10 wt % based on a weight of the charge transporting material. When the amount of thermal stabilizer is less than 0.01 wt % based on the weight of the charge transporting material, obtaining effects of using the thermal stabilizer is difficult, such as prevention of image quality degradation due to repetitive use of the photoreceptor, or the like. When the amount of thermal stabilizer is greater than 15 wt % based on the weight of the charge transporting material, the charge transporting layer abrades and interlayer adhesion strength deteriorates, and thus durability of the electrophotographic photoreceptor is decreased.

The binder resin that can be used in the charge generating layer and the charge transporting layer of the electrophotographic photoreceptor according to an embodiment of the present general inventive concept may be any insulating resin having a film forming ability without limitation. Examples of the binder resin include polycarbonate, polyarylate (a condensation polymer of bisphenol A and phthalic acid, and the like), polyamide, polyester, an acryl resin, a methacryl resin, polyvinyl chloride, polyvinylidene chloride, polystyrene, polyvinyl acetate, a styrene-butadiene copolymer, a vinylidene chloride-acrylonitrile copolymer, a vinyl chloride-vinyl acetate copolymer, a vinyl choloride-vinyl acetate-maleic anhydride copolymer, a silicone resin, a silicone-alkyd resin, a phenol-formaldehyde resin, a styrene-alkyd resin, polyvinyl acetal such as polyvinyl butyral and polyvinyl formal, polysulfone, casein, gelatin, polyvinyl alcohol, polyamide, a cellulose-based resin such as ethylcellulose, carboxymethylcellulose, and the like, polyurethane, a polyacrylamide resin, polyvinyl pyridine, an epoxy resin, polyketone, polyacrylonitrile, a melamine resin, polyvinyl pyrrolidone, and the like, but are not limited thereto. The binder resin described above may be used alone or in the combination of at least two of these compounds. The binder resin may also be an organic photoconductive resin such as poly(N-vinylcarbozole), polyvinyl anthracene, polyvinylpyrene, or the like.

In particular, the binder resin included in the charge transporting layer, which may be a surface layer of the electrophotographic photoreceptor, may be a polycarbonate resin, and particularly, a polycarbonate-Z derived from cyclohexylidene bisphenol rather than polycarbonate-A derived from bisphenol A and polycarbonate-C derived from methyl bisphenol A, due to high resistance thereof against abrasion.

A solvent of a coating dispersion or solution used to form the charge generating layer and the charge transporting layer according to an embodiment of the electrophotographic photoreceptor of the present embodiment may vary depending on a type of binder resin used, and may be selected from the ones that do not affect adjacent layers during the coating of the coating dispersion or solution. Examples of the solvent include aromatic hydrocarbons such as benzene, xylene, ligroin, monochlorobenzene, and dichlorobenzene; ketones such as acetone, methylethyl ketone, and cyclohexanone; alcohols such as methanol, ethanol, and isopropanol; esters such as ethyl acetate, and methyl cellosolve; halogenated aliphatic hydrocarbons such as tetrachlorocarbon, chloroform, dichloromethane, dichloroethane, and trichloroethylene; ethers such as tetrahydrofurane, dioxane, dioxolane, ethylene glycol monomethyl ether; amides such as N,N-dimethyl formamide, and N,N-dimethyl acetamide; and sulfoxides such as dimethyl sulfoxide. The solvent may be used alone or in a combination of at least two of these compounds.

The charge generating layer and the charge transporting layer according to an embodiment of the electrophotographic photoreceptor of the present general inventive concept may be formed by coating a uniform coating composition having the amount and component described above on the undercoat layer formed on an electrically conductive substrate and drying the resultant. A dispersing device used to obtain the uniform coating composition may be any dispersing device that is commonly known in the fields of paints and inks. Examples of the dispersing device include an attritor, a paint shaker, a ball mill, a sand mill, a high-speed mixer, a banbury mixer, a roll mill, a three-roll mill, a nanomizer, a microfluidizer, a stamp mill, a planetary mill, a vibrating mill, a kneader, and the like. During the dispersion of the coating composition, glass beads, steel beads, zirconium oxide beads, alumina balls, zirconium oxide balls, flint stones, or the like may be used, if necessary. The uniform coating composition, i.e., dispersion or solution, prepared using such a dispersing device is coated on the undercoat layer formed on the electrically conductive substrate to a predetermined thickness using a conventional coater, such as a dip coater, a spray coater, a wire bar coater, an applicator, a doctor blade, a roller coater, a curtain coater, or a bead coater, and then the resultant is dried. As a result, manufacturing of the electrophotographic photoreceptor of the present embodiment can be completed.

Alternatively, the photosensitive layer of the present embodiment may be, as described above, the single-layered type photosensitive layer including the charge generating material and the charge transporting material in a single layer. The single-layered photosensitive layer can be formed by dispersing or solubilising the charge generating material, the binder resin, and the charge transporting material in a solvent and coating the resultant on the undercoat layer formed on an electrically conductive substrate. A thickness of the single-layered type photosensitive layer may be generally in a range of about 5 μm to about 50 μm.

The undercoat layer and/or the photosensitive layer may further include additives such as a plasticizer, a surface modifier, an anti-oxidant, or the like.

The plasticizer may be biphenyl, biphenyl chloride, terphenyl, dibutyl phthalate, diethyleneglycol phthalate, dioctyl phthalate, triphenyl phosphate, methylnaphthalene, benzophenone, chlorinated paraffin, polypropylene, polystyrene, fluoro-hydrocarbons, or the like.

The surface modifier may be silicone oil, a fluorine resin, or the like.

The anti-oxidant may be a hindered phenol-based compound, an aromatic amine-based compound, a quinone-based compound, or the like.

In addition, the electrophotographic photoreceptor according to an embodiment of the present general inventive concept may further include, between the electrically conductive substrate and the undercoat layer, a metal oxide film such as an anodic oxide film formed using a sulfuric acid solution, an oxalic acid, or the like. The anodic oxide film may be an alumite film.

The electrophotographic photoreceptor according to an embodiment of the present general inventive concept may be integrated into an electrophotographic imaging apparatus of laser printers, photocopiers, facsimile machines, plotters, or the like.

FIG. 1 schematically illustrates an electrophotographic image forming apparatus according to an embodiment of the present general inventive concept, including a laminated type or single-layered type electrophotographic photoreceptor according to an embodiment of the present general inventive concept.

Referring to FIG. 1, the electrophotographic imaging apparatus according to the current embodiment of the present general inventive concept includes a semiconductor laser 1. Laser light that is signal-modulated by a control circuit 11 according to image information, is collimated by an optical correction system 2 after being radiated and performs scanning while being reflected by a polygonal rotatory mirror 3. The laser light is focused on a surface of an electrophotographic photoreceptor 5 by a f-θ lens 4 and exposes the surface according to the image information. Since the electrophotographic photoreceptor may be already charged by a charging apparatus 6, an electrostatic latent image is formed by the exposure, and then becomes visible by a developing apparatus 7. The visible image is transferred to an image receptor 12, such as paper, by a transferring apparatus 8, and is fixed in a fixing apparatus 10 and provided as a print result. The electrophotographic photoreceptor 5 can be used repeatedly by removing coloring agent that remains on the surface thereof by a cleaning apparatus 9. The electrophotographic photoreceptor 5 here is illustrated in a form of a drum, however, as described above, may also be in the form of a sheet, a belt, or the like. The electrophotographic photoreceptor 5 according to an embodiment of the present general inventive concept may be attached to the electrophotographic imaging apparatus or may also be detached from the electrophotographic imaging apparatus.

Hereinafter, the present general inventive concept will be described in further detail with reference to the following examples. These examples are for illustrative purposes only and are not intended to limit the scope of the present general inventive concept.

Preparation of Coating Dispersion A to Form an Undercoat Layer 100 g of a nylon resin (CM8000, manufactured by Toray Industries Inc.) was dissolved in 686 g of a mixed alcohol (methanol/1-propanol=8/2(weight ratio)) to obtain a nylon resin solution. 882 g of a mixed alcohol slurry (solids content 17.0 weight %) of a titanium dioxide particle (TTO-55N, obtained from Ishihara Industries Co, Ltd.) that had an average primary particle diameter of 30-50 nm and was not surface-treated, wherein the mixed alcohol slurry had been dispersed in advance by a ball mill, was added to the nylon resin solution and mixed. 4 g (corresponding to 0.8 g of diethyl citrate-chelated zirconate represented by Formula 1 where R1 and R2 are both an ethyl group, excluding an amount of an n-propyl alcohol solvent) of Tyzor®-ZEC (Dupont) was further added to the mixture prepared by mixing the nylon resin solution and the titanium dioxide dispersion. The resultant was uniformly dispersed using ultrasonic waves to obtain a coating dispersion A to form an undercoat layer, in which a weight ratio of titanium dioxide to nylon resin was 1.5:1, an amount of the chelated compound was 0.8 g based on 100 g of the nylon resin, and the total solids content was 15 wt%.

Preparation of Coating Dispersion B to Form an Undercoat Layer

A coating dispersion B to form an undercoat layer was prepared in the same manner as in a preparation of the coating dispersion A to form an undercoat layer, except that an amount of mixed alcohol used in the preparation of the nylon resin solution was changed to 688 g, and 10 g (2 g of diethyl citrate-chelated zirconate represented by Formula 1 where R1 and R2 are both an ethyl group, excluding the amount of an n-propyl alcohol solvent) of Tyzor®-ZEC (Dupont) was used. In the coating dispersion B to form an undercoat layer, a weight ratio of titanium dioxide to nylon resin was 1.5:1, the amount of chelated compound was 2 g based on 100 g of the nylon resin, and the total solids content was 15 wt%.

Preparation of Coating Dispersion C to Form an Undercoat Layer

A coating dispersion C to form an undercoat layer was prepared in the same manner as in a preparation of the coating dispersion A to form an undercoat layer, except that the amount of mixed alcohol used in the preparation of the nylon resin solution was changed to 685 g, and Tyzor®-ZEC (Dupont) was not added. In the coating dispersion C to form an undercoat layer, a weight ratio of titanium dioxide to nylon resin was 1.5:1, and the total solids content was 15 wt%.

Preparation of Coating Dispersion D to Form an Undercoat Layer

A coating dispersion D to form an undercoat layer was prepared in the same manner as in the preparation of the coating dispersion A to form an undercoat layer, except that the amount of mixed alcohol used in the preparation of the nylon resin solution was changed to 687.3 g, and 4 g (corresponding to 1 g of the titanium chelate Compound 8, excluding the weight of an iso-propyl alcohol solvent) of a titanium acetyl acetonate chelate compound represented by the following Compound 8 where $R_1$ and $R_2$ are a lower alkyl group (Tyzor-AA75 manufactured by Dupont) illustrated below was added instead of Tyzor®-ZEC (Dupont). In the coating dispersion D to form an undercoat layer, a weight ratio of titanium dioxide to nylon resin was 1.5:1, the amount of the titanium chelate compound was 1 g based on 100 g of the nylon resin, and the total solids content was 15 wt %.

(8)

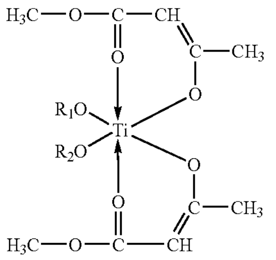

Preparation of Coating Dispersion E to Form an Undercoat Layer

A coating dispersion E to form an undercoat layer was prepared in the same manner as in the preparation of the coating dispersion A to form an undercoat layer, except that the amount of mixed alcohol used in the preparation of the nylon resin solution was changed to 691.3 g, and 10 g (corresponding to 2.5 g of the titanium chelate Compound 8, excluding a weight of the iso-propyl alcohol solvent) of the titanium acetyl acetonate chelate compound 8 represented by the formula above where $R_1$ and $R_2$ are a lower alkyl group (Tyzor®-AA75 manufactured by Dupont) was added instead of Tyzor®-ZEC (Dupont). In the coating dispersion E to form an undercoat layer, a weight ratio of titanium dioxide to nylon resin was 1.5:1, the amount of titanium chelate compound was 2.5 g based on 100 g of the nylon resin, and the total solids content was 15 wt %.

Preparation of Coating Dispersion F to Form an Undercoat Layer

A coating dispersion F to form an undercoat layer was prepared in the same manner as in the preparation of the coating dispersion A to form an undercoat layer, except that 4 g (corresponding to 0.8 g of the titanate Compound 9, except for the weight of an iso-propyl alcohol solvent) of a triethanol amine titanate compound 9 (Tyzor®-TE manufactured by Dupont) illustrated below was added instead of Tyzor®-ZEC (Dupont). In the coating dispersion F to form an undercoat layer, a weight ratio of titanium dioxide to nylon resin was 1.5:1, the amount of the titanate compound was 0.8 g based on 100 g of the nylon resin, and the total solids content was 15 wt %.

(9)

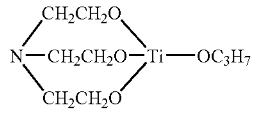

Preparation of Coating Dispersion G to Form an Undercoat Layer

A coating dispersion G to form an undercoat layer was prepared in the same manner as in the preparation of the coating dispersion A to form an undercoat layer, except that the amount of mixed alcohol used in a preparation of the nylon resin solution was changed to 688 g, and 10 g (corresponding to 2 g of the titanate Compound 9 illustrated above, excluding the weight of the iso-propyl alcohol solvent) of Compound 9 (Tyzor®-TE manufactured by Dupont) was added instead of Tyzor®-ZEC (Dupont). In the coating dispersion G to form an undercoat layer, a weight ratio of titanium dioxide to nylon resin was 1.5:1, an amount of titanate compound was 2 g based on 100 g of the nylon resin, and the total solids content was 15 wt %.

To evaluate the storage stability of each of the prepared coating dispersions A through G to form an undercoat layer, dispersibility and anti-precipitation properties thereof were evaluated by the following methods. The particle diameter of each coating dispersion was measured for comparison of the dispersibility properties, and a precipitation amount thereof was measured for comparison of the anti-precipitation properties.

Dispersibility

Immediately after the coating dispersions A through G to form an undercoat layer were prepared, the initial average primary particle diameter of titanium dioxide included in each of the coating dispersions A through G was measured. In addition, each coating dispersion was sealed in a vial and stored for three months at room temperature. Then, an average primary particle diameter of titanium dioxide included in each coating dispersion was measured.

The measurement of the average primary particle diameter was performed as follows. That is, each coating dispersion was diluted using methanol having a weight 500 times greater than a weight of the each corresponding coating dispersion, and then an appropriate amount thereof was collected to measure an average primary particle diameter of each coating dispersion by using an electrophortic light scattering spectrophotometer (ELS-8000 manufactured by Otsuka Electronics Co., Ltd.). From this, the dispersibility of each of the coating dispersions A through G to form an undercoat layer was evaluated as follows:

◎: when a difference between an initial average primary particle diameter and an average primary particle diameter after three months was in a range of 0 to 10 nm (excellent), ○: when a difference between an initial average primary particle diameter and an average primary particle diameter after three months was in a range of 11 to 20 nm (good), Δ: when a difference between an initial average primary particle diameter and an average primary particle diameter after three months was in a range of 21 to 30 nm (average), ×: when a difference between an initial average primary particle diameter and an average primary particle diameter after three months was 31 nm or more (poor).

Anti-Precipitation Properties 10 ml of each of the coating dispersions A through G to form an undercoat layer was poured into a mess cylinder graduated at 0.2 ml intervals, and then each cylinder was sealed and stored at room temperature. After three months, each coating dispersion in the mess cylinder was removed and an amount of precipitation on a bottom surface of the mess cylinder was measured. From this, anti-precipitation properties of each of the coating dispersions A through G to form an undercoat layer were evaluated as follows:

◎: when the amount of precipitation on the bottom surface of the mess cylinder was less than 0.2 ml (excellent), ○: when the amount of precipitation on the bottom surface of the mess cylinder was in a range of equal to or greater than 0.2 to less than 0.4 ml (good), Δ: when the amount of precipitation on the bottom surface of the mess cylinder was in a range of 0.4 to 0.6 ml (average), ×: when the amount of precipitation on the bottom surface of the mess cylinder was greater than 0.6 ml (poor).

TABLE 1

| Coating dispersion to form an undercoat layer | Chelate compound | | Average primary particle diameter (nm) | | | Anti- |
|---|---|---|---|---|---|---|
| | Type | Amount (g) | Right after preparation | After three months | Dispersibility | precipitation properties |
| A | Diethyl citrate-chelated zirconate | 0.8 | 172 | 180 | ◎ | ◎ |
| B | Diethyl citrate-chelated zirconate | 2 | 165 | 174 | ◎ | ◎ |
| C | — | — | 180 | 205 | Δ | X |
| D | Titanium acetylacetonate | 1 | 179 | 190 | ○ | Δ |
| E | Titanium acetylacetonate | 2.5 | 170 | 210 | X | X |
| F | Triethanol amine titanate | 0.8 | 174 | 350 | X | X |
| G | Triethanol amine titanate | 2 | 169 | 530 | X | X |

Referring to Table 1, the coating dispersion A to form an undercoat layer including diethyl citrate-chelated zirconate had excellent dispersibility and anti-precipitation properties. However, the coating dispersions D through F using titanium acetylacetonate or triethanol amine titanate, i.e., an alcohol-soluble chelate compound containing titanium, had poor dispersibility and anti-precipitation properties. In addition, the larger an amount of the alcohol-soluble chelate compound containing titanium, the worse the dispersibility and anti-precipitation properties.

Evaluation of Resistance to Discoloration

Each of the coating dispersions A, C, D, and F to form an undercoat layer was sealed and left sit for three months at room temperature. Then, each coating dispersion was coated on the aluminum film formed on a (Polyethylene Terephthalate) PET sheet to form a film having a thickness of about 3 to 4 μm.

Resistance to discoloration of each film was evaluated by the following method.

CIE color space coordinate values L*, a*, and b* of the films were measured using a Chroma-Meter (CR-400 manufactured by Minolta Konica). From the respective values, differences of ΔL*, Δa*, and Δb* values for the film formed using each of the coating dispersions A, C, D, and F to form an undercoat layer, right after preparation and three months after the coating dispersion was sealed and left sit at room temperature, were calculated to evaluate the resistance to discoloration of each film. The results are illustrated in Table 2 below. Herein, L* refers to lightness of the color, and L*=0 refers to black, and L*=100 refers to white. The value a* refers to a position between red and magenta, and if a* is a negative value, a* refers to green, and if a* is a positive value, a* refers to magenta. The value b* refers to a position between yellow and blue, and if b* is a negative value, b* refers to blue, and if b* is a positive value, b* refers to yellow.

Preparation of Charge Generating Layer (CGL) Coating Dispersion 10 g of α-titanyloxy phthalocyanine (α-TiOPc), Compound 10 below, was mixed with 5 g of a polyvinyl butyral (PVB) binder resin (PVB 6000-C, Denki Kagaku Kogyo Kabushiki Kaisha) and 100 g of tetrahydrofurane (THF). The mixture was sand milled for about two hours and than treated with ultrasonic waves to prepare a CGL coating dispersion.

(10)

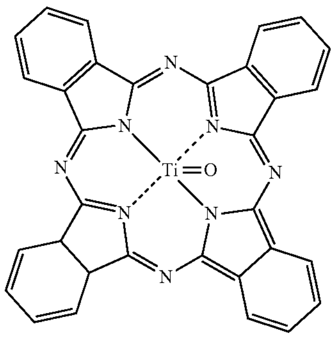

Preparation of Charge Transporting Layer (CTL) Coating Solution 50 g of Compound 11 illustrated below and 30 g of Compound 12 illustrated below as a charge transporting material, 100 g of a polycarbonate resin (Panlight TS-2050, Teijin Chemical Ltd.), and 0.1 g of silicone oil (Product name: KF-50, Shinetsu Chemical Co., Ltd., Japan) were dissolved in a mixed solvent of 534 g of THF and 178 g of toluene to prepare a CTL coating solution.

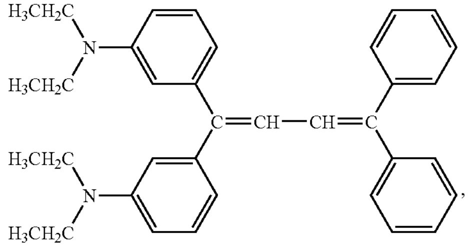

(11)

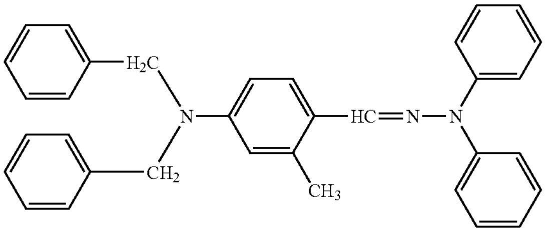

(12)

EXAMPLE 1

An aluminum drum having an external diameter of 30 mm and a length of 248 mm was dip-coated in the coating dispersion A to form an undercoat layer, right after a preparation thereof and three months after being sealed and left to sit, respectively, and dried to form an undercoat layer having a thickness of about 1 μm on the aluminum drum.

The aluminum drum with the undercoat layer coated thereon was dip-coated in the CGL coating dispersion and dried to form a charge generating layer having a thickness of about 0.4 μm on the undercoat layer. The aluminum drum was dip-coated in the CTL coating solution and dried to form a charge transporting layer having a thickness of about 20 μm on the charge generating layer. As a result, manufacturing of a photoreceptor drum was completed.

COMPARATIVE EXAMPLE 1

A photoreceptor drum was manufactured in the same manner as in Example 1, except that the coating dispersion C to form an undercoat layer was used instead of the coating dispersion A to form an undercoat layer.

COMPARATIVE EXAMPLE 2

A photoreceptor drum was manufactured in the same manner as in Example 1, except that the coating dispersion D to form an undercoat layer was used instead of the coating dispersion A to form an undercoat layer.

COMPARATIVE EXAMPLE 3

A photoreceptor drum was manufactured in the same manner as in Example 1, except that the coating dispersion F to form an undercoat layer was used instead of the coating dispersion A to form an undercoat layer.

Evaluation of Electrical Properties

The electrical properties of the photoreceptor drums were measured using a photoreceptor evaluation apparatus (available from QEA INC., "PDT-2000") under environmental conditions of a temperature of 23° C. and a relative humidity of 50% as follows.

Each photoreceptor drum was charged at a voltage of −800 V, and right after charging, the photoreceptor drum was exposed to light by irradiating a monochromatic light having a wavelength of 780 nm while varying an exposure energy in a range of 0 to 10 μJ/cm$^2$. Herein, $E_{1/2}$ (μJ/cm2) which denotes the exposure energy per unit area that is required to decrease the charged potential of a photoreceptor to half of the initial charged potential thereof and $E_{100}$ (μJ/cm2) which denotes the exposure energy per unit area that is required to decrease the charged potential of a photoreceptor drum to −100 V were obtained. From these values, differences between sensitivities of the photoreceptor drums using the coating dispersions to form an undercoat layer, right after a preparation thereof and three months after being sealed and left to sit, respectively, were obtained. The results are illustrated in Table 2 below.

Evaluation of Adhesion Strength 25 grid lines of each photoreceptor drum prepared above were formed on a photosensitive layer at about 3 mm intervals using a cutter knife, an adhesive tape (810D, 3M company) was uniformly coated on the photosensitive layer, and then grid lines were taken from the photosensitive layer by pulling off the tape. A number of grids remaining on the photosensitive layer was counted to compare photoreceptor drums with each other. The results are illustrated in Table 2 below.

◎: the number of grids remaining on the photosensitive layer was greater than 25 (excellent), ○: the number of grids remaining on the photosensitive layer was in a range of 20 to 25 (good)

Δ: the number of grids remaining on the photosensitive layer was in a range of 10 to 19 (average)

×: the number of grids remaining on the photosensitive layer was in a range of 0 to 9 (poor)

TABLE 2

| | Dispersion to form an undercoat layer | Chelate compound | Storage period | Differences in L*, a*, and b* | | | $E_{1/2}$ (μJ/□) | $E_{100}$ (μJ/□) | A.S.# |
|---|---|---|---|---|---|---|---|---|---|
| | | | | L* | a* | b* | | | |
| Ex* 1 | A | Diethylcitrate-Chelated zirconate | Right after preparation | 82.57 | −4.64 | 4.53 | 0.274 | 0.812 | ◎ |
| | | | Three months | 82.58 | −4.62 | 4.51 | 0.272 | 0.812 | ◎ |
| | | | Δvalue | 0.01 | 0.02 | 0.02 | 0.002 | 0.000 | — |
| CE* 1 | C | — | Right after preparation | 82.85 | −5.08 | 3.82 | 0.328 | 0.966 | X |
| | | | Three months | 82.84 | −5.03 | 3.79 | 0.333 | 0.975 | X |
| | | | Δvalue | 0.01 | 0.03 | 0.03 | 0.005 | 0.009 | — |

TABLE 2-continued

| | Dispersion to form an undercoat layer | Chelate compound | Storage period | Differences in L*, a*, and b* L* | a* | b* | $E_{1/2}$ (μJ/□) | $E_{100}$ (μJ/□) | A.S.[#] |
|---|---|---|---|---|---|---|---|---|---|
| CE 2 | D | Titanium acetyl acetonate | Right after preparation | 83.42 | −5.32 | 6.66 | 0.309 | 0.855 | ⊚ |
| | | | Three months | 81.91 | −4.99 | 6.04 | 0.361 | 0.903 | ⊚ |
| | | | Δvalue | 1.51 | 0.33 | 0.62 | 0.052 | 0.048 | — |
| CE 3 | F | Triethanol amine titanate | Right after preparation | 82.30 | −4.82 | 4.22 | 0.291 | 0.813 | Δ |
| | | | Three months | 82.28 | −4.80 | 4.18 | 0.321 | 0.820 | X |
| | | | Δvalue | 0.02 | 0.02 | 0.04 | 0.030 | 0.007 | — |

*Ex refers to Example and CE refers to Comparative Example.

[#]A.S refers to adhesion strength

Referring to Table 2, in the case of Example 1 in which the undercoat layer is formed using the coating dispersion A to form an undercoat layer which includes diethylcitrate-chelated zirconate, the photoreceptor drum including the undercoat layer has excellent resistance to discoloration as illustrated by the small ΔL*, Δa*, and Δb* values, high adhesion strength, and excellent stability of electrical properties.

In the case of Comparative Example 2 in which the undercoat layer is formed using the coating dispersion C to form an undercoat layer which includes titaniumacetyl acetonate, the photoreceptor drum including the undercoat layer has good adhesion strength and poor resistance to discoloration as illustrated by the large ΔL*, Δa*, and Δb* values, and poor stability of electrical properties.

In the case of Comparative Example 3 in which the undercoat layer is formed using the coating dispersion F to form an undercoat layer which includes triethanolamine titanate, the photoreceptor drum including the undercoat layer has good resistance to discoloration and poor adhesion strength and poorer stability of electrical properties than Example 1.

In the case of Comparative Example 1 in which the undercoat layer is formed using the coating dispersion C to form an undercoat layer that does not include a chelate compound, the photoreceptor drum including the undercoat layer has poor adhesion strength and the poorest stability of electrical properties.

A coating dispersion to form an undercoat layer according to an embodiment of the present general inventive concept includes dialkylcitrate-chelated zirconate represented by Formula 1, and thus the composition has excellent dispersibility, resistance to precipitation, storage stability, and resistance to discoloration. An electrophotographic photoreceptor according to an embodiment of the present general inventive concept includes an undercoat layer that is formed using the coating dispersion to form an undercoat layer, and thus the electrophotographic photoreceptor has excellent stability of electrical properties and interlayer adhesion strength. It is assumed that this is because the dialkylcitrate-chelated zirconate of Formula 1 can interact with a functional group such as a hydroxyl group or a carboxyl group included in the binder resin and metal oxide particles, and thus agglomeration or gelation of the metal oxide particles can be effectively prevented, and the dialkylcitrate-chelated zirconate of Formula 1 can be crosslinked with the binder resin, thus interlayer adhesion strength between the undercoat layer and the photosensitive layer being increased.

While the present general inventive concept has been particularly illustrated and described with reference to exemplary embodiments thereof, it will be understood by those of ordinary skill in the art that various changes in form and details may be made therein without departing from the spirit and scope of the present general inventive concept as defined by the following claims.

What is claimed is:

1. An electrophotographic photoreceptor, comprising:

an undercoat layer and a photosensitive layer that are sequentially formed on an electrically conductive substrate, wherein the undercoat layer has a structure in which metal oxide particles and dialkylcitrate-chelated zirconate represented by Formula 1 below are dissolved or dispersed in a binder resin:

<Formula 1>

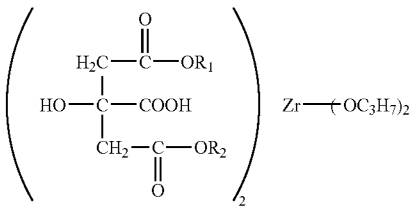

wherein $R_1$ and $R_2$ are each independently a $C_{1-20}$ linear or branched alkyl group, and wherein the undercoat layer comprises 50 to 200 parts by weight of the metal oxide particles and 0.2 to 2 parts by weight of dialkylcitrate-chelated zirconate based on 100 parts by weight of the binder resin.

2. The electrophotographic photoreceptor of claim 1, wherein the photosensitive layer comprises:

a laminated type comprising a charge generating layer including a charge generating material and a charge transporting layer including a charge transporting material.

3. The electrophotographic photoreceptor of claim 1, wherein the photosensitive layer comprises:

a single-layered type comprising a charge generating material and a charge transporting material in a single layer.

4. The electrophotographic photoreceptor of claim 1, wherein the metal oxide particles comprise:

at least one selected from the group consisting of tin oxide, indium oxide, zinc oxide, titanium oxide, silicon oxide, zirconium oxide, and aluminum oxide.

5. The electrophotographic photoreceptor of claim 1, wherein the binder resin of the undercoat layer comprises:

at least one selected from the group consisting of a polyamide resin, a phenol resin, a melamine resin, an alkyd resin, a polyurethane resin, an unsaturated polyester resin, and an epoxy resin.

6. The electrophotographic photoreceptor of claim 1, wherein $R_1$ and $R_2$ are each independently a methyl group, an ethyl group, or an isopropyl group.

7. The electrophotographic photoreceptor of claim 1, further comprising:

a metal oxide layer between the electrically conductive substrate and the undercoat layer.

8. An electrophotographic imaging apparatus, comprising:

an electrophotographic photoreceptor;

a charging unit to charge a photosensitive layer of the electrophotographic photoreceptor;

a light exposure unit to form an electrostatic latent image on a surface of the photosensitive layer of the electrophotographic photoreceptor; and a developer to develop the electrostatic latent image, wherein the electrophotographic photoreceptor comprises an undercoat layer and a photosensitive layer that are sequentially formed on an electrically conductive substrate, and the undercoat layer has a structure in which metal oxide particles and dialkylcitrate-chelated zirconate represented by Formula 1 below are dissolved or dispersed in a binder resin:

<Formula 1>

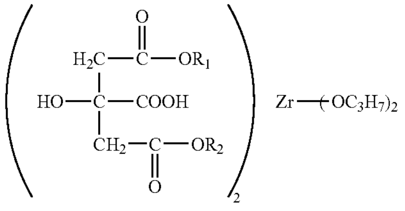

wherein $R_1$ and $R_2$ are each independently a $C_{1-20}$ linear or branched alkyl group, and wherein the undercoat layer comprises 50 to 200 parts by weight of the metal oxide particles and 0.2 to 2 parts by weight of dialkylcitrate-chelated zirconate based on 100 parts by weight of the binder resin.

9. The electrophotographic imaging apparatus of claim 8, wherein the photosensitive layer comprises:

a laminated type comprising a charge generating layer including a charge generating material and a charge transporting layer including a charge transporting material.

10. The electrophotographic imaging apparatus of claim 8, wherein the photosensitive layer comprises:

a single-layered type comprising a charge generating material and a charge transporting material in a single layer.

11. The electrophotographic imaging apparatus of claim 8, wherein the metal oxide particles comprise:

at least one selected from the group consisting of tin oxide, indium oxide, zinc oxide, titanium oxide, silicon oxide, zirconium oxide, and aluminum oxide.

12. The electrophotographic imaging apparatus of claim 8, wherein the binder resin of the undercoat layer comprises:

at least one selected from the group consisting of a polyamide resin, a phenol resin, a melamine resin, an alkid resin, a polyurethane resin, an unsaturated polyester resin, and an epoxy resin.

13. The electrophotographic imaging apparatus of claim 8, wherein $R_1$ and $R_2$ are each independently a methyl group, an ethyl group, or an isopropyl group.

14. The electrophotographic imaging apparatus of claim 8, wherein the electrophotographic photoreceptor further comprises:

a metal oxide layer between the electrically conductive substrate and the undercoat layer.

15. A composition, comprising:

a binder resin, metal oxide particles, dialkylcitrate-chelated zirconate represented by Formula 1 below, and a solvent or a dispersing medium:

<Formula 1>

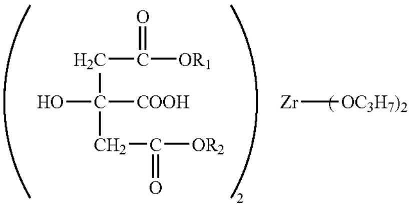

wherein $R_1$ and $R_2$ are each independently a $C_{1-20}$ linear or branched alkyl group and 50 to 200 parts by weight of the metal oxide particles and 0.2 to 2 parts by weight of dialkylcitrate-chelated zirconate represented by Formula 1 based on 100 parts by weight of the binder resin, and an amount of the solvent or dispersing medium being adjusted so that a total solids content of the binder resin, the metal oxide particles and dialkylcitrate-chelated zirconate is in a range of 10 to 30 wt%.

* * * * *